United States Patent
Arici et al.

(10) Patent No.: US 12,141,236 B1
(45) Date of Patent: Nov. 12, 2024

(54) VISION-AND-LANGUAGE MODEL TRAINING

(71) Applicant: Amazon Technologies, Inc., Reno, NV (US)

(72) Inventors: Tarik Arici, New York, NY (US); Mehmet Saygin Seyfioglu, Seattle, WA (US); Ismail Baha Tutar, Seattle, WA (US); Tal Neiman, Brooklyn, NY (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 480 days.

(21) Appl. No.: 17/526,282

(22) Filed: Nov. 15, 2021

(51) Int. Cl.
| | |
|---|---|
| *G06F 18/214* | (2023.01) |
| *G06F 18/25* | (2023.01) |
| *G06F 40/30* | (2020.01) |
| *G06T 9/00* | (2006.01) |
| *G06V 30/262* | (2022.01) |
| *G06N 3/08* | (2023.01) |

(52) U.S. Cl.
CPC ........ *G06F 18/2148* (2023.01); *G06F 18/251* (2023.01); *G06F 40/30* (2020.01); *G06T 9/002* (2013.01); *G06V 30/262* (2022.01); *G06N 3/08* (2013.01)

(58) Field of Classification Search
CPC .... G06F 18/2148; G06F 18/251; G06F 40/30; G06T 9/002; G06V 30/262; G06N 3/08
USPC .......................................................... 382/157
See application file for complete search history.

(56) References Cited

U.S. PATENT DOCUMENTS

| | | | | |
|---|---|---|---|---|
| 11,310,539 B1 * | 4/2022 | Yun | ................. | G06V 20/48 |
| 11,797,530 B1 * | 10/2023 | Bouyarmane | .......... | G06N 3/045 |
| 11,842,738 B1 * | 12/2023 | Yan | ................. | G06N 3/084 |
| 2021/0232773 A1 * | 7/2021 | Wang | ................. | G06F 18/21 |
| 2022/0277218 A1 * | 9/2022 | Fan | ................. | G06N 3/08 |
| 2022/0405524 A1 * | 12/2022 | Yuan | ................. | G06N 3/0442 |

FOREIGN PATENT DOCUMENTS

| | | | | |
|---|---|---|---|---|
| CN | 112733533 | * | 4/2021 | ........... G06F 40/279 |
| CN | 112861864 | * | 5/2021 | ........... G06V 30/153 |

* cited by examiner

*Primary Examiner* — Jerome Grant, II
(74) *Attorney, Agent, or Firm* — HOGAN LOVELLS US LLP

(57) ABSTRACT

Systems and methods for improving training processes for image and text applications are described. A first set of embeddings may be generated based on a text input, and a second set of embeddings may be generated via a convolutional neural network (CNN), based on an input image. The first set of embeddings and the second set of embeddings may be utilized to generate a third set of embeddings including one or more placeholder values to be replaced. The placeholder values may be replaced based on predicted values, to reconstruct the input text and image.

20 Claims, 7 Drawing Sheets

VISION-AND-LANGUAGE MODEL TRAINING

BACKGROUND

Vision and Language Pre-Training (VLP) models aim to improve the performance of cross-modal downstream tasks which may require image and text inputs for processing. For example, in the e-commerce space, it may be beneficial to provide a system which can fill in text and images within a catalog, or enable a user to search for products having similar text and images as the initial query. Cross-modality interaction may be limited in conventional VLP models due to restrictions in information flow inherently present in the model. For example, depending on the specific architecture being used to perform pre-training processing, low-level pixel embeddings might not be able to directly interact with higher-level text embeddings. Conventional models may be text-specific or image-specific, where in those models, processing both text and image together may yield inaccurate results or be computationally expensive.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed toward one or more training procedures that use, at least in part, image reconstruction and pre-training with image reconstruction and modeling, such as Masked Language Modeling (MLM), to simplify loss function and design. Various embodiments may reduce training complexity, such as enabling network training without incorporation of image-text pairings for generated training instances. Embodiments may further include one or more image embedders, such as an embedder associated with a shallow convolutional neural network (CNN). Furthermore, Modality-Aware Masking (MAM) may be utilized along with one or more loss functions to encourage cross-modal information flow.

Figure 1:
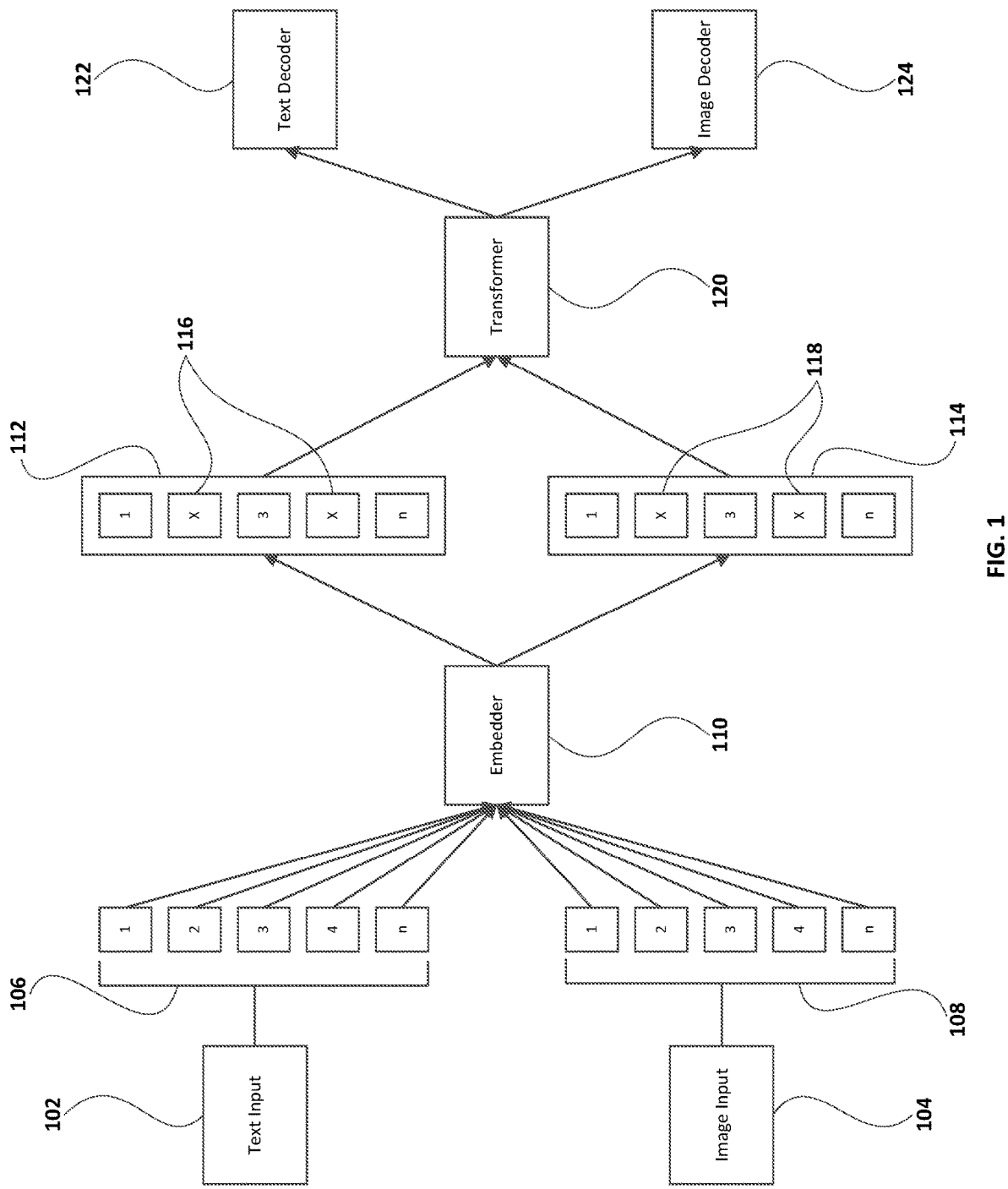
FIG. 1 illustrates an example process flow diagram that can be used, in accordance with various embodiments of the present disclosure.

FIG. 1 provides an example process flow diagram that may be used in accordance with one or more embodiments of the present disclosure. According to an example embodiment, one or more inputs may be provided to a computing system. For example, a text input 102 and an image input 104 may be received. Other inputs, such as audio and video, may also be received and utilized in accordance with one or more embodiments described herein. In at least one embodiment, a video input may be broken down into one or more frames, which may then be correlated to an image input. Furthermore, in at least one embodiment, one or more processing techniques, such as a Natural Language Processing (NLP) technique may be utilized to convert audio into textual inputs or to identify and transcribe textual data from images. The computing system may then convert the text input 102 to a set of word embeddings 106. According to an example, one or more words of the text input may be tokenized, such that individual words may be assigned a value and stored as a known vocabulary, such as in a look-up table.

The image input 104 may also be converted to a set of embeddings, such as image embeddings 108. According to an example embodiment, a shallow convolutional neural network (CNN) model may be used to embed an input image and generate image-positional embeddings. The CNN model may be specifically designed for image embedding, and may be further configured to handle other processes associated with image embedding and processing. It should be appreciated that while various embodiments may be described with reference to a CNN, one or more additional neural network models may also be utilized with aspects of the present disclosure. A CNN model according to an example embodiment may include convolutional layers having two-dimensional filters of kernel size 2×2 and a stride of 2. However, other filter specifications may be utilized as may be required for the system. For example, selecting a kernel size having horizontal and vertical dimensions matching the stride may ensure each input will only contribute to a single filter's output, to improve one or more aspects of later steps of the pre-training process. Embedding an input image in this manner may improve the processing speed of a computing system, especially when compared to conventional systems which may have heavyweight and cumbersome models for image embedding.

In conventional systems, input images may be masked by randomly selecting image pixels and converting them to black, white, or gray colors, without first creating image embeddings. Through use of a shallow CNN in the image embedding process, according to one or more embodiments described herein, image pixels may be provided at higher-level representations which can improve the cross-modal interaction between the image and text embeddings. For example, the output image embeddings may correspond to one or more input image regions, in the form of meaningful compressed representations of the original image pixels.

After the set of word embeddings and the set of image embeddings have been created or generated, one or more values from the word embeddings may be applied to the image embeddings. For example, the set of word embeddings and set of image embeddings might not correspond to each other in the image-pixel domain. In other words, there might not be a discernable correlation between the word embeddings and the image embeddings. The word embeddings may include words written to a specific vector encoded in latent space. Words or tokens of the word embeddings may be erased, and virtual proxy words that do not exist in the vocabulary of the look-up table may overwrite known words of the word embeddings. For example, a virtual proxy word may correspond to a specific token value, and this token value for the virtual proxy word may replace a token value corresponding to a known word.

The word embeddings with the removed values may be applied to the generated image embeddings such that the replaced token values may be randomly written over specific image embeddings of the generated image embeddings. In this way, both the word embeddings and the image embeddings are correlated with each other in a new set of embeddings, such as embeddings 112 and 114, and may be provided or generated via embedder 110. The new embeddings may include one or more values to be filled in, such as values 116 and 118. Using the new embeddings with the correlated image and text allows for improved cross-modality interaction between image and text, making it easier for an attention mechanism of a transformer, such as transformer 120, to predict and fill in the values, such as values 116 and 118, of the new embeddings 112 and 114.

Various transformer-based machine learning techniques may be utilized in accordance with one or more embodiments of the present disclosure. For example, Bidirectional Encoder Representations from Transformers (BERT) may be utilized to apply one or more of the various pre-training steps described herein. However, BERT is primarily utilized for Natural Language Processing (NLP) pre-training, and might not be able to process and classify images with high accuracy. Therefore, one or more approaches described herein may be directed towards BERT-based pre-training processes which may ultimately enable recognition and reconstruction of text and image together. Image-based transformers may alternatively be utilized in accordance with one or more embodiments described herein.

According to an example, a transformer, such as transformer 120, may be utilized to help understand both text and image by fusing text and image components together such that the combined text and image components may be utilized to represent an item or text for one or more downstream applications. Such a downstream application may include one or more tasks which may require a pair-wise comparison or classification, or tasks which require analysis of text and image to determine a relationship between the two modalities.

Once the transformer 120 has processed the new embeddings 112 and 114, the new embeddings 112 and 114 may be decoded. According to an example embodiment, values may be predicted to fill in the values 116 and 118 from the new embeddings 112 and 114. Context information determined by the transformer 120 to predict one or more values to fill in the values 116 and 118 and decode the text, and context information associated with the text may be utilized to decode the image. For example, when reconstructing the image via image decoder 124, the transformer 120 may utilize text information from the new embeddings to extract context information to help determine how to reconstruct image regions. Additionally, to decode the text via text decoder 122, the transformer 120 may utilize image information from the new embeddings to extract context information, to help determine one or more words of text corresponding to the input text.

Figure 2:
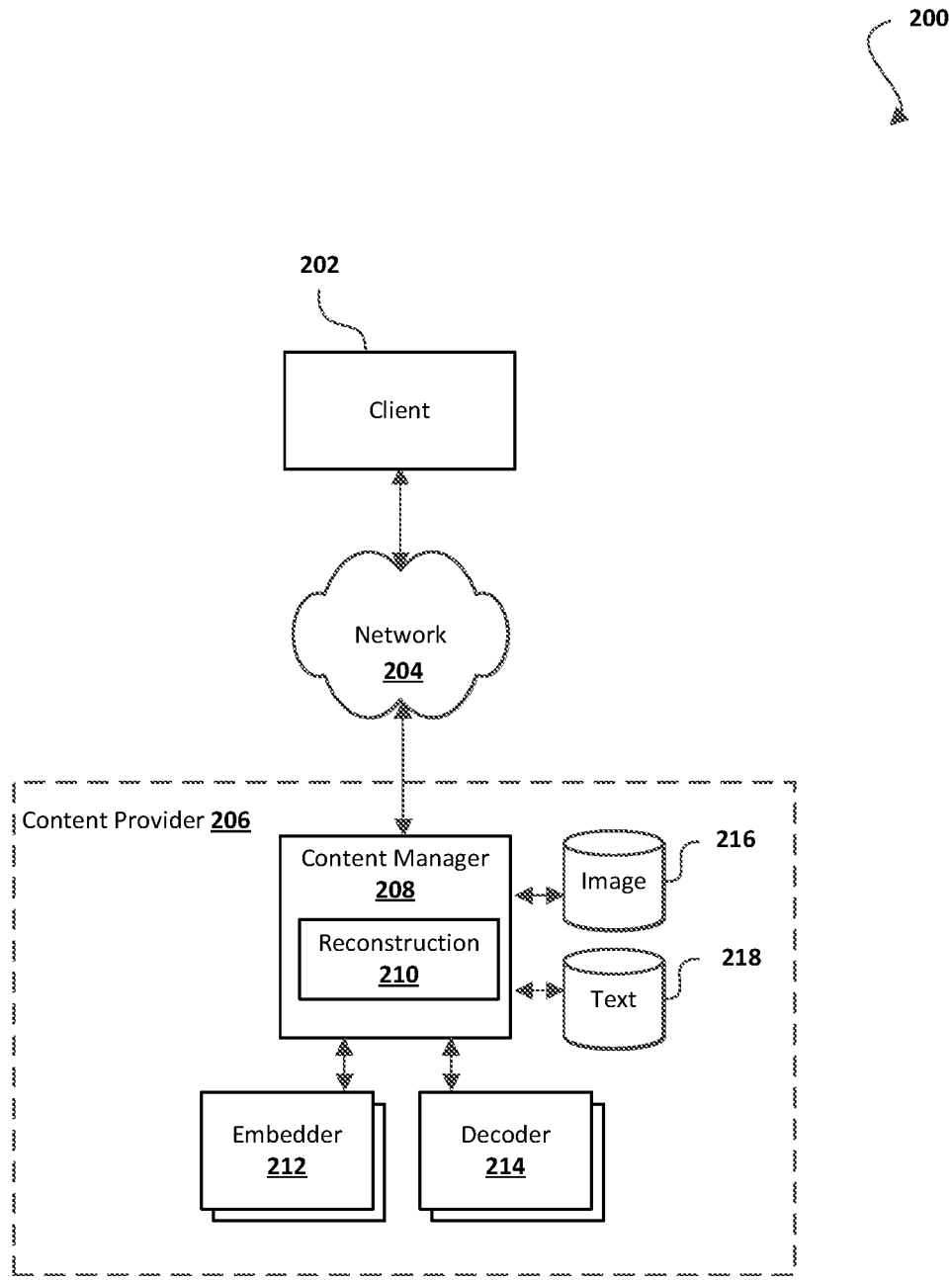
FIG. 2 illustrates an example system for processing text and image data in accordance with various embodiments of the present disclosure.

FIG. 2 illustrates a set of components of an example system 200 that can be utilized to implement aspects of various embodiments. In this example, a client 202 may submit one or more requests across a network 204, to be received at a content provider environment 206. A request, according to an example, may include any type of request where image and text are processed together. A content provider environment, according to an example, may include a content manager 208 including one or more components capable of reconstructing 210 one or more image and text inputs. According to an example, a user may submit a request to generate a posting for a catalog based on text and image. In this example, a text input and an image input may be received at the content manager 208. Other inputs, such as audio and video, may also be received and utilized in accordance with one or more embodiments described herein. In at least one embodiment, a video input may be broken down into one or more frames, which may then be correlated to an image input. Furthermore, in at least one embodiment, one or more processing techniques, such as a Natural Language Processing (NLP) technique may be utilized to convert audio into textual inputs or to identify and transcribe textual data from images.

An embedder 212 of the content provider environment 206 may be utilized to generate image and word embeddings of the input text and image. The computing system may then convert the text input to a set of word embeddings. According to an example, one or more words of the text input may be tokenized, such that individual words may be assigned a value and stored as a known vocabulary in one or more databases, such as text database(s) 218. The image input may also be converted to a set of embeddings, such as image embeddings, via embedder 212. The image embeddings may also be stored, with corresponding pixel values, in one or more image databases 216.

After the set of word embeddings and the set of image embeddings have been created or generated, one or more values from the word embeddings may be applied to the image embeddings. For example, the set of word embeddings and set of image embeddings might not correspond to each other in the image-pixel domain. In other words, there might not be a discernable correlation between the word embeddings and the image embeddings. The word embeddings may include words written to a specific vector encoded in latent space. Words or tokens of the word embeddings may be erased, and virtual proxy words that do not exist in the vocabulary of the look-up table may overwrite known words of the word embeddings. For example, a virtual proxy word may correspond to a specific token value, and this token value for the virtual proxy word may replace a token value corresponding to a known word.

The word embeddings with the removed values may be applied to the generated image embeddings such that the replaced token values may be randomly written over specific image embeddings of the generated image embeddings. In this way, both the word embeddings and the image embeddings are correlated with each other in a new set of embeddings, and may be provided or generated via embedder 212. Using the new embeddings with the correlated image and text allows for improved cross-modality interaction between image and text, making it easier for an attention mechanism of a transformer to predict and fill in the values.

According to an example embodiment, values may be predicted to fill in the values from the new embeddings. Cross-modality information across the new embeddings may be correlated and utilized to fill in the missing values and decode the text and image via decoder 214. For example, when reconstructing the image via the decoder 214, text information from the new embeddings may be analyzed to extract context information, in order to determine how to reconstruct image regions. Additionally, to decode the text, image information from the new embeddings may be analyzed to extract context information, to help determine one or more words of text corresponding to the input text.

Catalog data for a given environment, such as an e-commerce environment, may be utilized as an input for one or more pre-training processes in accordance with various embodiments. Other text and image data which may be associated with other platforms or environments may be utilized for pre-training as well. A catalog according to an example embodiment may include items available for purchase online. The items may be provided as a part of a listing which may include one or more image and textual attributes. According to an example embodiment, one or more item images may be single-item images, and textual data may include a description of one or more attributes of the item. Multi-item images or images having busy backgrounds may also be utilized for pre-training processes, in addition to price information, complex caption information, and other textual information for the one or more items. For pre-training, items may be sampled with their corresponding attributes from the catalog.

One or more approaches described herein may be used to determine closely matching item pairs. According to an example, a pair of items may be labeled as a match or mismatch depending on variations between the two items. Matched items may be used to provide one or more recommendations to a user. For example, a user may enter a search for an item on an e-commerce platform. The system may be able to determine one or more matching pairs of items based on the labeled item pairs, and provide the matching items as recommendations for similar items which may be of interest to a user. However, this example is not intended to be limiting, and the example pre-training processes described herein may also be utilized for other applications, and may be generally applicable across applications which may utilize image and textual features. For example, one or more pre-training processes described herein may be utilized to generate titles and captions for an item, generate images associated with text, predict customer-perceived duplicate items and near-duplicates, validate that a title provided corresponds to an image provided, among other such functions. In simplifying pre-training tasks in this way, training time and computational costs may be reduced.

Accordingly, approaches in accordance with various embodiments improve the operation and performance of the computing device(s) on which they are implemented and with which they communicate wirelessly by, among other advantages, increasing the accuracy of providing desired results for downstream tasks using machine learning techniques. In an example, such a system can improve an online shopping experience in that it provides results that are accurate and consistent for a given user.

Systems and methods in accordance with various embodiments of the present disclosure may overcome one or more of the aforementioned and other deficiencies experienced in conventional approaches for providing content in an electronic environment. For example, one or more of the embodiments described herein are directed towards simplifying loss function design while improving cross-modal information flow in a machine learning-based pre-training process for downstream tasks. In particular, various embodiments provide a system for pre-training a machine learning model, such as a neural network-based model, to improve the accuracy of one or more downstream tasks which may require text and image processing. In various embodiments, a text input may be converted to one or more word vectors or embeddings. Additionally, an image input may be converted to one or more image vectors or embeddings, using a convolutional neural network (CNN). As described herein, "vector" can be referred to as "embedding" in accordance with various embodiments. Such conversions of the text and image input to embeddings may be performed simultaneously or sequentially. Information from the word embeddings may be applied to the image embeddings such that the word embeddings and the image embeddings share at least one correlation with each other. One or more values of the word embeddings and the image embeddings may be removed and used to generate a third set of embeddings. The third set of embeddings may have one or more placeholder values to be filled in, in place of the values removed from the word embeddings and the image embeddings. According to an example embodiment, the same placeholder values may be utilized to replace the removed values of the word embeddings and image embeddings.

Once the third set of embeddings have been created, a transformer layer may be utilized to predict one or more values corresponding to known values associated with the first set of embeddings and the second set of embeddings, to be used to fill in the one or more placeholder values of the third set of embeddings. In accordance with various embodiments, the one or more placeholder values may be filled in for the third set of embeddings, to perform one or more downstream tasks. For example, such a task may include reconstructing at least one of the text input and the image input. In accordance with other embodiments, such a task may include performing pair-wise classification of text and image data, or comparing text and image data to determine whether the text corresponds to the image. Through one or more techniques described herein, products in a catalog may also be searched, and similar products may be determined and provided to a user.

One or more techniques described herein may enable the computing system to improve the speed and accuracy of one or more pre-training processes, minimizing the number of user-provided labels required for training. The present techniques may process text and image inputs beyond what can be accurately performed by human annotators or through human language. Machine generated embeddings can represent image data in ways no human can possibly generate, and can only be generated using computing devices, and more specifically computing devices specially equipped with machine learning capabilities. Additionally, not only are computing devices indispensable to the generation of such embeddings as described herein, but such data is also only readable by and meaningful to computing devices. Thus, the systems and methods described herein are fundamentally tied to computing machines and provide improvements to computing technology. Various other applications, processes, and uses are presented below with respect to the various embodiments, each of which improves the operation and performance of the computing device(s) on which they are implemented.

During one or more decoding processes, loss or error functions may be applied to the results of the decoding process for analysis and evaluation of the model. For example, one or more error functions may be applied to quantify the difference between the computed output of the neural network and the true value for an input of the neural network. In training machine learning models, such as VLP models, error or loss functions may be analyzed to evaluate how well a specific algorithm models the given data, and reduce the error in prediction. Some VLP models may utilize alignment-based loss functions and image-region modeling-based loss functions to evaluate the prediction. However, such functions might not rely on ground truth, or are based almost entirely on heuristics, which may cause the data to be inaccurate.

For example, in some systems, masked image-region modeling (MIRM) may be utilized. MIRM may involve masked region-of-interest (RoI) feature regression and masked RoI classification tasks. Contrastive loss may be used to detect RoI tags with randomly sampled tag sequences. However, MIRM relies on object detectors and proxy targets (e.g., RoI features) or labels (e.g., predicted object categories), which may be wrong or irrelevant for a given context. Additionally, to improve learning for VLP models, alignment-based loss functions may be utilized for cross-modality (e.g., image and text) interaction. Such alignments may occur at the modality-level such as a widely used Image Text Matching (ITM) task, or at finer-grained levels such as a Word-Region Alignment (WRA) via Optimal Transport (OT) task. However, alignment tasks often require pairings. While creating negative pairs for ITM is fairly simple, it may be difficult to retrieve these pairs at train-time. Further, WRA does not have ground truth available, so it is difficult to evaluate and fine-tune the model for accuracy.

According to an example embodiment, loss function design for one or more pre-training processes may be simplified by utilizing masked language modeling (MLM) and masked image modeling (MIM), both of which have ground truth available. MLM, which determines a negative log-likelihood for words for the new embeddings, may be used to help predict words to fill in for the new embeddings from available words and image regions. According to an example embodiment, human-annotated labels might not be required to help predict the words. MLM and a multilayer perceptron (MLP) may be used within a transformer-based neural network to output logits over available vocabulary. The results of the MLM process may be utilized to reconstruct text.

MIM, according to an example embodiment, may be used in a decoder process to reconstruct the full image from available words and image regions. RECON loss may enable the model to learn how to optimize image reconstruction. RECON loss may be defined as an average of pixel-wise sum of squared errors (SSE). While an MLM task may only be used to fill in tokens for the new embeddings and text, MIM may be used to reconstruct the full image, and more specifically, the new embeddings and the image embeddings corresponding to the image regions. Because the original image embeddings correspond to the input image regions in the form of compressed representations of the original image pixels, reconstruction of the entire image may be performed with high accuracy. With the improved accuracy provided by the MLM/MIM approach described above, there is no need to use image-region feature prediction, image-region classification, or alignment loss at the modality or embedding sequence-position level. Overall loss function design may be simplified, and text-image pairings may not be necessary to create training instances like in alignment-based loss functions. Further, initial input images may be utilized for analysis, providing ground truth data to compare the decoded results to. Additionally, in capturing text and image reconstruction quality through use of this MLM/MIM approach, cross-modal information flow across text and image may be improved.

Figure 3:
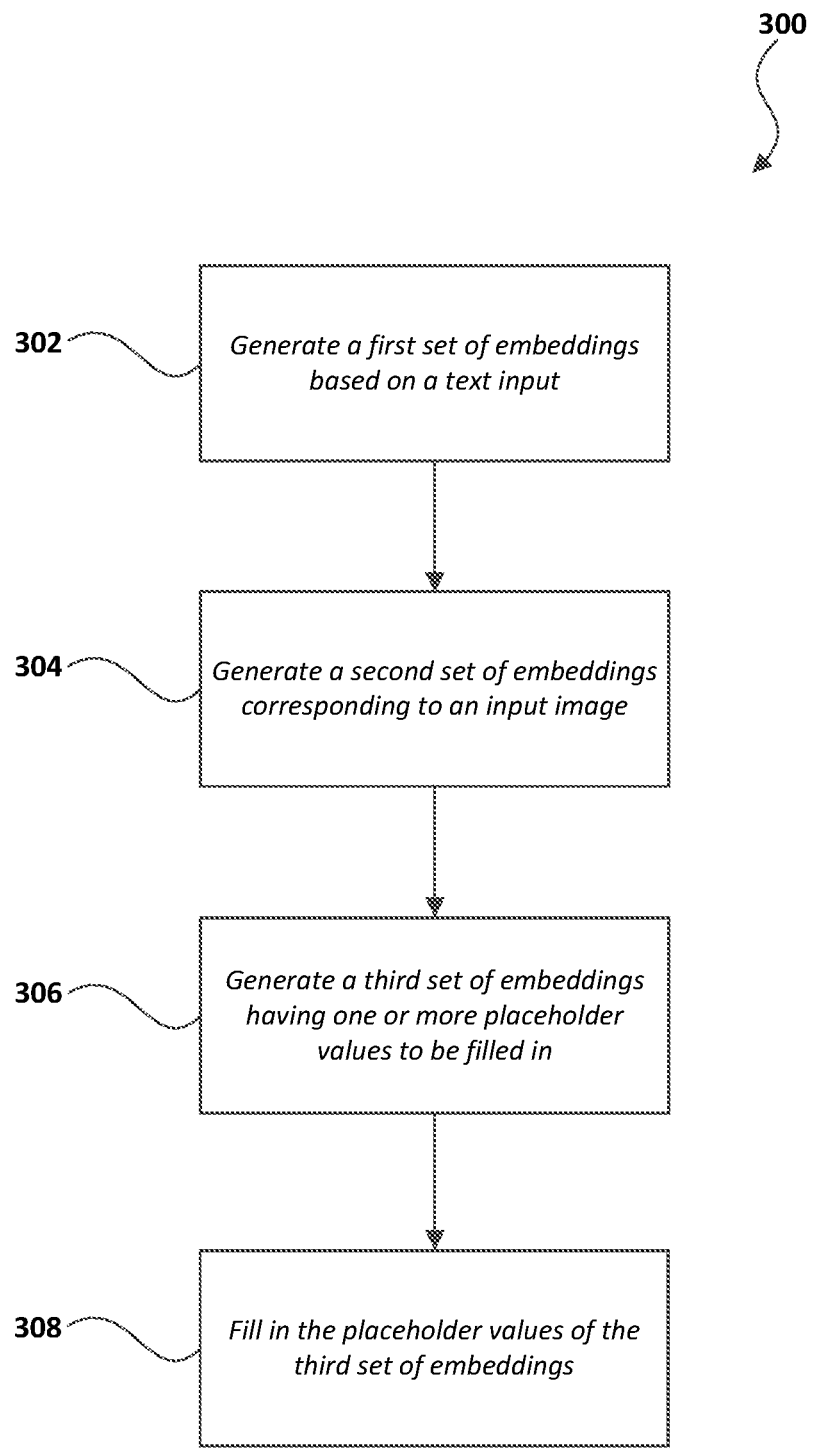
FIG. 3 illustrates an example process for pre-training a neural network, in accordance with various embodiments of the present disclosure.

FIG. 3 shows an example method for one or more pre-training processes, according to an example embodiment. One or more pre-training processes may start by generating 302 a first set of embeddings based on a text input. For example, the one or more text inputs may be tokenized and transformed into one or more word embeddings. Tokenization may be defined as a process which separates text into smaller units, or tokens, which can be words, characters, or sub-words. Text inputs can be tokenized and transformed into one or more word embeddings. The tokens may each be associated with a known vocabulary corresponding to a vector. According to a look-up table, each word in the vocabulary may correspond to a vector.

A second set of embeddings, corresponding to image embeddings, may be generated 304. The second set of embeddings may be generated as a separate process from the word embeddings, and as such, the image embeddings may be generated before, after, or simultaneous to the generation of the word embeddings. For the image embeddings, a shallow convolutional neural network (CNN) model may be used to embed an input image and generate image-positional embeddings. The CNN model may be specifically designed for image embedding in addition to other processes associated with image embedding and processing. A CNN model according to an example embodiment may include convolutional layers having two-dimensional filters of kernel size 2×2 and a stride of 2. However, other filter specifications may be utilized as may be required for the system. For example, selecting a kernel size having horizontal and vertical dimensions matching the stride may ensure each input will only contribute to a single filter's output, to improve one or more aspects of later steps of the pre-training process. Embedding an input image in this way may improve the processing speed of a computing system, especially when compared to systems which may utilize heavy-weight and cumbersome models for image embedding. While a shallow CNN may be utilized in this example, this example is not intended to be limiting, and other methods for image embedding may alternatively be utilized.

The generated word embeddings and generated image embeddings might not correspond to each other in the image-pixel domain. For example, there might not be a discernable correlation between the word embeddings and the image embeddings. The word embeddings may include words written to a specific vector encoded in latent space. Words or tokens of the word embeddings may be erased, and virtual proxy words that do not exist in the vocabulary of the look-up table may overwrite known words of the word embeddings. For example, a virtual proxy word may correspond to a specific token value, and this token value for the virtual proxy word may replace a token value corresponding to a known word.

By way of illustration only, the word embeddings may have corresponding tokens assigned for each word, such as a value of 1 for a word "sock". Based on this token value, one or more words of a sentence may be converted to word embeddings comprised entirely of values, where the values of the word embeddings have associated meanings stored in a look-up table. After the word embeddings have been generated, one or more values may be removed and replaced with a value corresponding to a virtual proxy word. For example, the value 2 may not have a corresponding vocabulary word in the look-up table, so the value 2 may overwrite the value of 1 to generate new word embeddings which do not include an association with the word "sock".

The same value of 2 from the new word embeddings may be written over specific vectors of the generated image embeddings. For example, one or more vectors produced at the output of the generated image embeddings may be overwritten with the value of 2, to generate new image embeddings such that both text and image are correlated with each other, without the associated word "sock".

As shown in the illustration above, the generated word embeddings and image embeddings may be used to generate a third set of embeddings 306, where one or more values from the word embeddings and image embeddings have been removed. In conventional systems, input images may be masked by randomly selecting image pixels and converting them to black, white, or gray colors, without first creating image embeddings. Through use of a shallow CNN in the image embedding process, as described above, image pixels may be provided at higher-level representations which can improve the cross-modal interaction between the image and text embeddings. For example, the output image embeddings may correspond to one or more input image regions, in the form of meaningful compressed representations of the original image pixels. The word embeddings with the removed values may be applied to the generated image embeddings such that the replaced token values may be randomly written over specific image embeddings of the generated image embeddings. In this way, both the word embeddings and the image embeddings are correlated with each other in new embeddings, where the new embeddings include values to be filled in. Using the new embeddings with the correlated image and text allows for improved cross-modality interaction between image and text, which makes it easier for an attention mechanism of a transformer to predict and fill in the values of the new embeddings.

According to an example embodiment, a transformer neural network model may be utilized to process text and image inputs. Through the use of the transformer, all of the words in a text input may be passed simultaneously, and word embeddings for the words in the text input may be determined simultaneously. For a transformer to understand which locations of the input image that the image embeddings are coming from, positional embeddings may be assigned and applied to the image embeddings. According to an example, an input image may be of high resolution. The high-resolution image may be flattened and converted to a two-dimensional representation of the input image to enable a transformer to understand the spatial locations of features in the input image. Such positional embeddings may be part of another layer of the neural network model. Sequential numbers, or image-positional values, may be embedded for the two-dimensional representation.

The word embeddings may also have positional embeddings and such positional embeddings may be provided separately from the word-positional embeddings. By having separate positional embeddings for the word embedding and the image embedding, a separate modality embedding such as a segment modality is not required. While text and image modalities are described herein, other modalities may also be utilized, such as audio and video.

The same new embeddings may be associated with both the word embeddings and the image embeddings. For example, using a lookup table, the same tokens used for the word embeddings may be written to the image embedding such that the word embeddings and image embeddings can be correlated with one another. In this way, there is no need to generate new embeddings separately for the word embeddings and the image embeddings.

Additionally, according to an example embodiment, the positional embeddings of the word and image embeddings may be applied to the new embeddings. Then, one or more transformer layers may recognize the new embeddings as special embeddings which need to be filled in, independent of the modality, by attending to other embeddings in the layer inputs.

Before sending the new embeddings to the transformer for further pre-training processing, probability values may be assigned for both the word embeddings and the image embeddings. For example, a developer or engineer may assign a probability value to the word embeddings and a probability of the image embeddings and determine an amount of the tokens of pixel values to remove from the generated image embeddings and word embeddings. According to an example, with equal probability, only values for the image embeddings may be removed while maintaining the word embeddings as is, or only values for the word embeddings may be removed while maintaining the image embeddings as is. Such a system may enable cross-modality signal flow between the two modalities in that if one of the image or word embeddings have values removed, then the other of the image or word modalities would be used as context information by the model to fill in the missing values.

After creating the new embeddings with the missing values, the new embeddings may be fed pairwise to a transformer such that the transformer may receive a combined image and text representation as the new embeddings. The transformer may analyze the text and image together, and using an attention mechanism of the transformer, the original input text and image may be reconstructed. Because the new embeddings comprise correlated information for both the text modality and the image modality, cross-modality interaction between text and image is improved, making it easier for the transformer to reconstruct the original text and image inputs. The transformer may rely on context information associated with text or image to reconstruct the inputs. For example, when reconstructing the image, the transformer may utilize text information from the new embeddings to extract context information to help predict how to reconstruct image regions. For example, the transformer may predict values corresponding to known values from the look-up table, to be used to fill in the placeholder values of the new embeddings. Based on the predicted values, the placeholder values may be replaced with the predicted values 308, to reconstruct the image. Additionally, the transformer may utilize image information from the new embeddings to extract context information to help determine one or more words of text corresponding to the input text.

Figure 4:
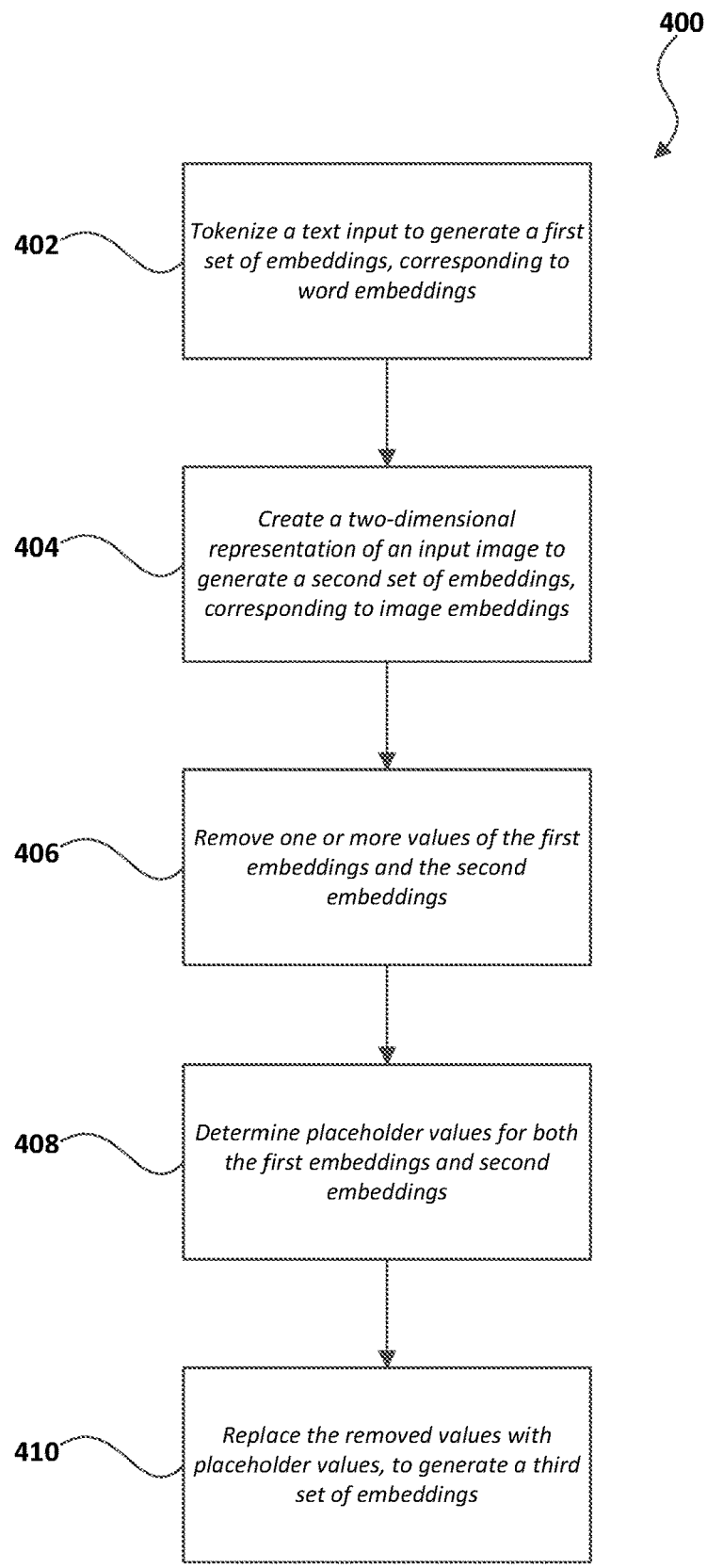
FIG. 4 illustrates an example sub-process for pre-training a neural network, in accordance with various embodiments of the present disclosure.

FIG. 4 illustrates an example process for generating new embeddings for use in one or more pre-training processes, in accordance with an example embodiment. For example, as described above, a text input may be processed and converted to generate a first set of embeddings, corresponding to word embeddings 402. Additionally, an input image may be flattened to a two-dimensional representation of the input image, and embedded to generate image embeddings 404. Positional information associated with one or more values of the word embeddings may be applied to one or more values of the image embeddings.

For example, a transformer according to an example may determine positional embeddings and tokenize a text input to generate a word embedding for use in a pre-training phase of a machine learning process. Through the use of the transformer, all of the words in a text input may be passed simultaneously, and word embeddings for the words in the text input may be determined simultaneously. For a transformer to understand which locations of the input image that the image embeddings are coming from, positional embeddings may be assigned and applied to the image embeddings. According to an example, an input image may be of high resolution. The high-resolution image may be flattened and converted to a two-dimensional representation of the input image to enable a transformer to understand the spatial locations of features in the input image. Such positional embeddings may be part of another layer of the neural network model. Sequential numbers, or image-positional values, may be embedded for the two-dimensional representation.

One or more values of the word embeddings and the image embeddings may be removed 406. The removed values may be replaced with placeholder values having no corresponding vocabulary or pixel values 408, to generate a new set of embeddings 410. According to an example, the same placeholder values may be applied across both the word embeddings and image embeddings. The new set of embeddings may then be utilized in one or more pre-training processes described herein.

Figure 5:
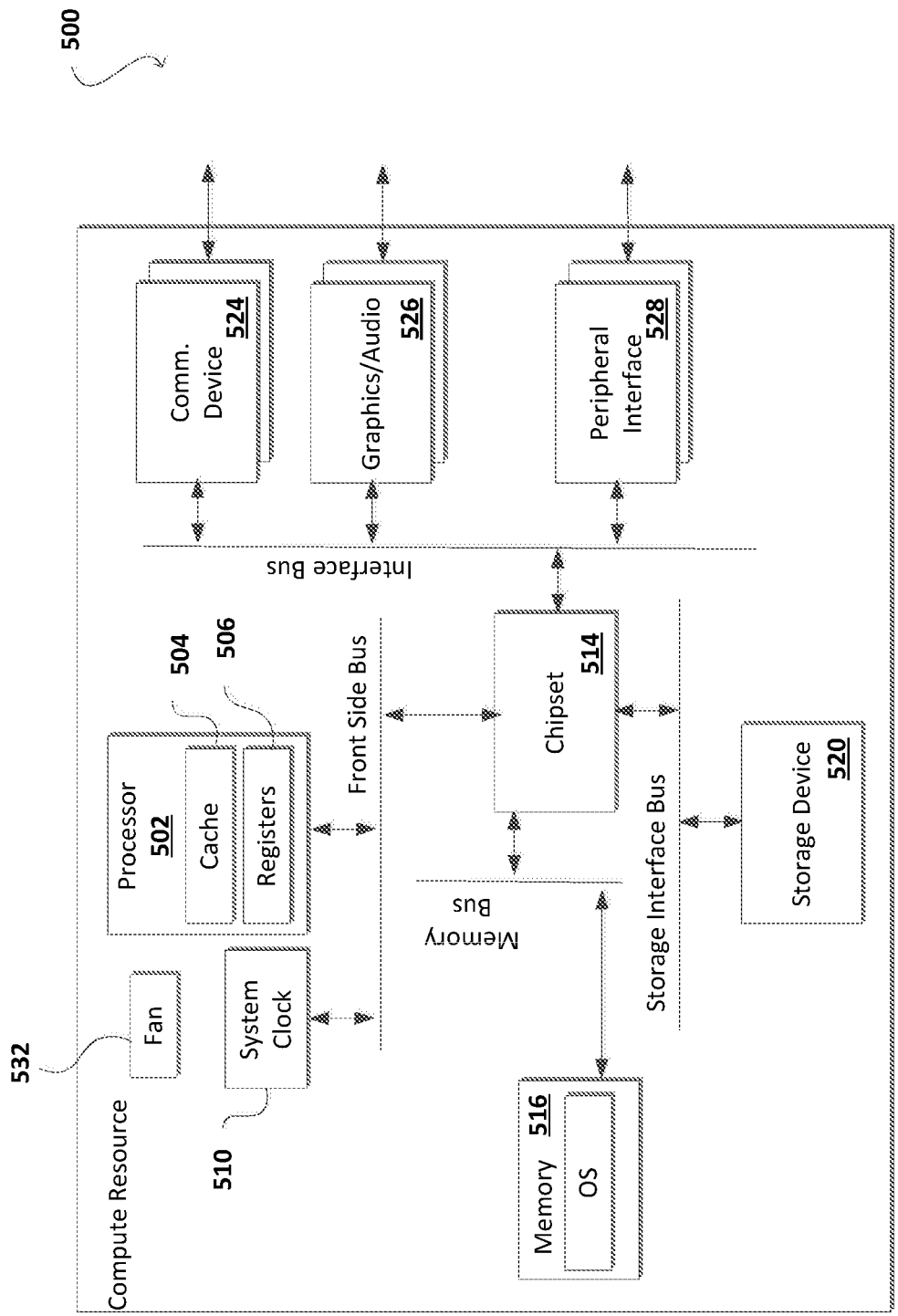
FIG. 5 illustrates a set of basic components of one or more devices that can be used, in accordance with various embodiments of the present disclosure.

Computing resources, such as servers or personal computers, will generally include at least a set of standard components configured for general purpose operation, although various proprietary components and configurations can be used as well within the scope of the various embodiments. FIG. 5 illustrates components of an example computing resource 500 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 500 (e.g., a desktop or network server) will have one or more processors 502, such as central processing units (CPUs), graphics processing units (GPUs), and the like, that are electronically and/or communicatively coupled with various components using various buses, traces, and other such mechanisms. A processor 502 can include memory registers 506 and cache memory 504 for holding instructions, data, and the like. In this example, a chipset 514, which can include a northbridge and southbridge in some embodiments, can work with the various system buses to connect the processor 502 to components such as system memory 516, in the form or physical RAM or ROM, which can include the code for the operating system as well as various other instructions and data utilized for operation of the computing device. The computing device can also contain, or communicate with, one or more storage devices 520, such as hard drives, flash drives, optical storage, and the like, for persisting data and instructions similar, or in addition to, those stored in the processor and memory. The processor 502 can also communicate with various other components via the chipset 514 and an interface bus (or graphics bus, etc.), where those components can include communications devices 524 such as cellular modems or network cards, media components 526, such as graphics cards and audio components, and peripheral interfaces 528 for connecting peripheral devices, such as printers, keyboards, and the like. At least one cooling fan 532 or other such temperature regulating or reducing component can also be included as well, which can be driven by the processor or triggered by various other sensors or components on, or remote from, the device. Various other or alternative components and configurations can be utilized as well as known in the art for computing devices.

At least one processor 502 can obtain data from physical memory 516, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 504 in at least some embodiments. The computing device 500 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 528, a communication device 524, a graphics or audio card 526, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 502 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive messages, such as datagrams.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 6:
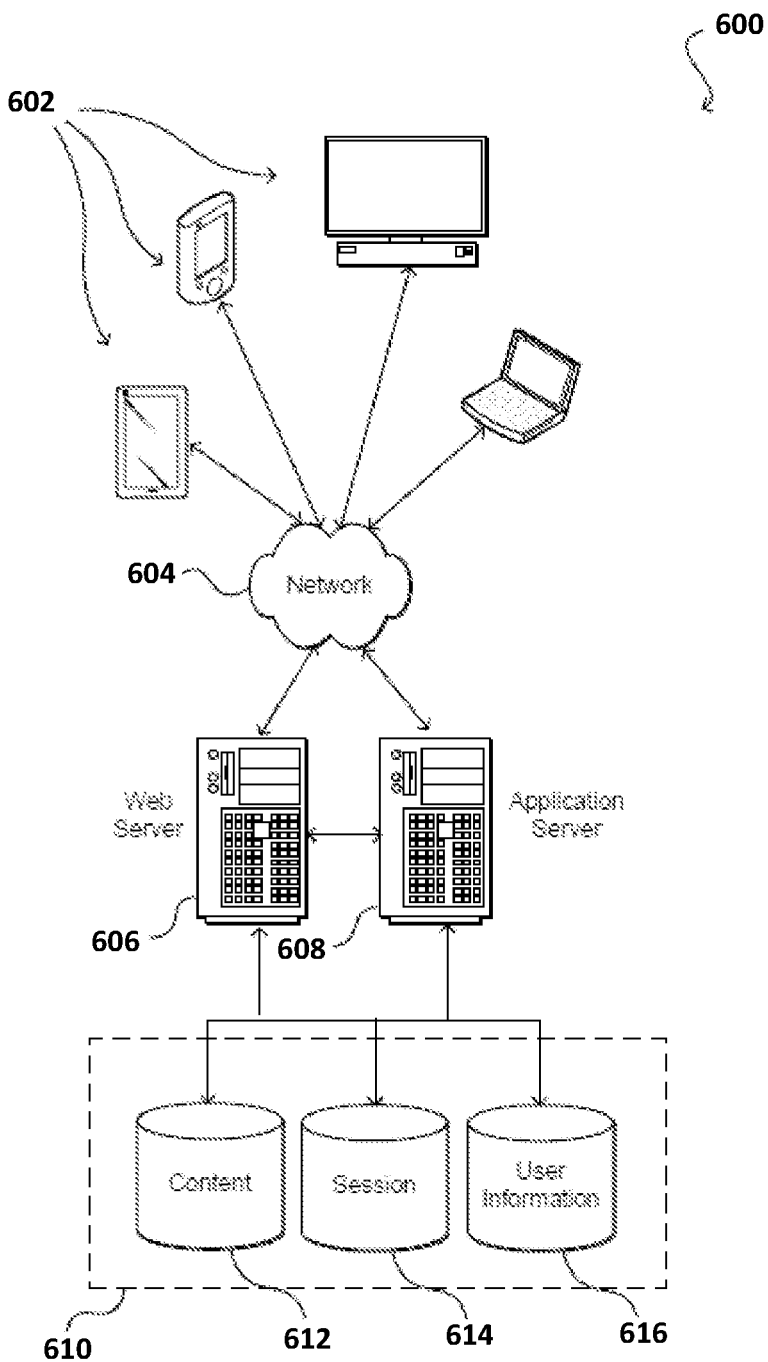
FIG. 6 illustrates an example environment for implementing aspects of the various embodiments of the present disclosure.

FIG. 6 illustrates an example environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks, an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein, the term data "store" refers to any device or combination of devices capable of storing, accessing and retrieving data, which may include any combination and number of data servers, databases, data storage devices and data storage media, in any standard, distributed or clustered environment. The application server 608 can include any appropriate hardware and software for integrating with the data store 610 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 606 in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing content 612 and user information 616, which can be used to serve content for the production side. The data store is also shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser. Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure. The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

Figure 7:
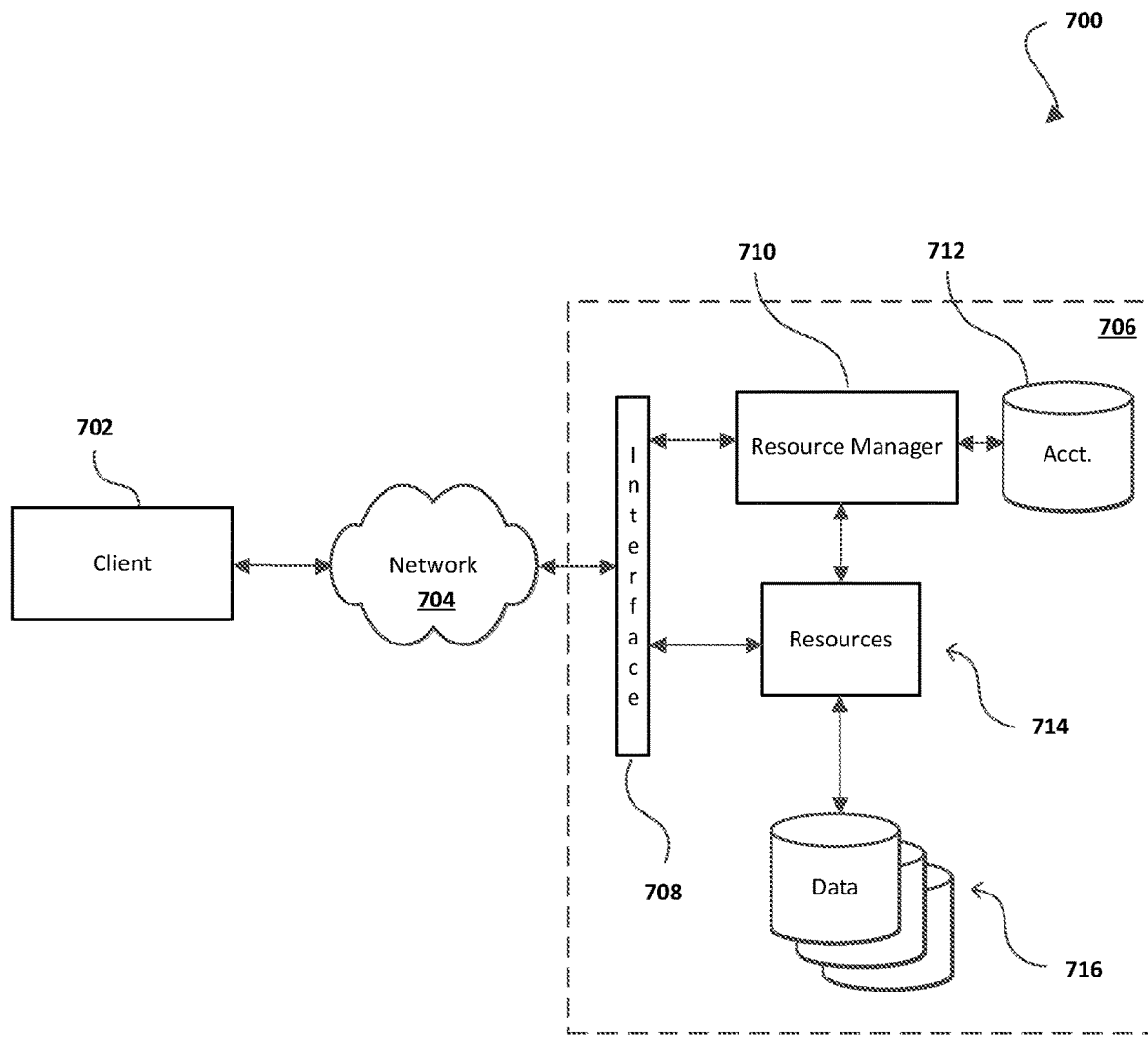
FIG. 7 illustrates an example environment in which various embodiments may be implemented.

FIG. 7 illustrates an example environment 700 in which aspects of the various embodiments can be implemented. In this example a user is able to utilize a client device 702 to submit requests across at least one network 704 to a resource provider environment 706. The client device can include any appropriate electronic device operable to send and receive requests, messages, or other such information over an appropriate network and convey information back to a user of the device. Examples of such client devices include personal computers, tablet computers, smart phones, notebook computers, and the like. The network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 714 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts 712 and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 716 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed. Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
generating a first set of embeddings based on a text input;
generating a second set of embeddings corresponding to an input image;
associating the first set of embeddings with the second set of embeddings;
generating, based at least in part on the first set of embeddings and the second set of embeddings, a third set of embeddings including one or more placeholder values associated with one or more values removed from the first set of embeddings and the second set of embeddings;
predicting one or more values corresponding to known values associated with the first set of embeddings and the second set of embeddings; and
reconstructing at least one of the text input and the image input based, at least in part, on replacing the one or more placeholder values with the one or more predicted values.

2. The computer-implemented method of claim 1, wherein the generating the third set of embeddings comprises:
removing at least a subset of the one or more values of the first set of embeddings and the second set of embeddings;
replacing the removed subset of the one or more values with the one or more placeholder values.

3. The computer-implemented method of claim 1, wherein the predicting one or more values to be used to fill in the one or more placeholder values of the third set of embeddings further comprises:
extracting context information from at least one of the first set of embeddings and the second set of embeddings;
predicting, based at least in part on the context information, the one or more values to replace the one or more placeholder values of the third set of embeddings.

4. The computer-implemented method of claim 1, wherein the filling in the one or more placeholder values of the third set of embeddings comprises:
determining, based at least in part upon a first loss function and a second loss function, one or more values corresponding to the one or more placeholder values to be filled in,
wherein the first loss function is utilized to determine one or more words to fill in the one or more placeholder values of the third set of embeddings, and
wherein the second loss function is utilized to determine pixel values for one or more image regions to fill in the one or more placeholder values of the third set of embeddings.

5. The computer-implemented method of claim 1, wherein the second set of embeddings are generated based at least in part on converting the image input to a two-dimensional representation and assigning one or more sequential numbers corresponding to one or more positional values in the two-dimensional representation.

6. A computing system, comprising:
a computing device processor; and
a memory device including instructions that, when executed by the computing device processor, enable the computing system to:
generate a first text representation having one or more values based, at least in part, on a text input;
generate a first image representation having one or more values based, at least in part, on an image input;
provide a subset of the one or more values of the text representation and a subset of the one or more values of the image representation to a transformer;
generate, via the transformer, a second text representation including the subset of values of the text representation and one or more additional values determined based, at least in part, on the one or more values of the subset corresponding to the image representation; and
generate, via the transformer, a second image representation including the subset of values of the image representation and one or more additional values determined based, at least in part, on the one or more values of the subset corresponding to the text representation.

7. The computing system of claim 6, wherein the instructions, when executed by the computing device processor, further enable the computing system to:
decode the second text representation and the second image representation.

8. The computing system of claim 7, wherein the instructions, when executed by the computing device processor, further enable the computing system to:
apply a first loss function and a second loss function to the decoded second text representation and the decoded second image representation, respectively.

9. The computing system of claim 6, wherein the instructions, when executed by the computing device processor, further enable the computing system to:
generate a new first text representation comprising the subset of the one or more values of the text representation; and
generate a new first image representation comprising the subset of the one or more values of the image representation.

10. The computing system of claim 9, wherein the instructions, when executed by the computing device processor, further enable the computing system to:
extract context information from at least one of the new first text representation and the new first image representation.

11. The computing system of claim 6, wherein the instructions, when executed by the computing device processor, further enable the computing system to:
apply one or more values associated with the first text representation to the first image representation.

12. The computing system of claim 6, wherein the first image representation is generated based, at least in part, on converting the image input to a two-dimensional representation and assigning one or more sequential numbers corresponding to one or more positional values in the two-dimensional representation.

13. The computing system of claim 6, wherein the instructions, when executed by the computing device processor, further enable the computing system to:
reconstruct at least one of the first text representation and the first image representation.

14. A computer-implemented method, comprising:
generate a first text representation having one or more values based, at least in part, on a text input;
generate a first image representation having one or more values based, at least in part, on an image input;
provide a subset of the one or more values of the text representation and a subset of the one or more values of the image representation to a transformer;
generate, via the transformer, a second text representation including the subset of values of the text representation and one or more additional values determined based, at least in part, on the one or more values of the subset corresponding to the image representation; and
generate, via the transformer, a second image representation including the subset of values of the image representation and one or more additional values determined based, at least in part, on the one or more values of the subset corresponding to the text representation.

15. The computer-implemented method of claim 14, further comprising:
decoding the second text representation and the second image representation.

16. The computer-implemented method of claim 15, further comprising:
applying a first loss function and a second loss function to the decoded second text representation and the decoded second image representation, respectively.

17. The computer-implemented method of claim 14, further comprising:
generating a new first text representation comprising the subset of the one or more values of the text representation; and
generating a new first image representation comprising the subset of the one or more values of the image representation.

18. The computer-implemented method of claim 17, further comprising:
extracting context information from at least one of the new first text representation and the new first image representation.

19. The computer-implemented method of claim 14, further comprising:
apply one or more values associated with the first text representation to the first image representation.

20. The computer-implemented method of claim 14, wherein the first image representation is generated based, at least in part, on converting the image input to a two-dimensional representation and assigning one or more sequential numbers corresponding to one or more positional values in the two-dimensional representation.

* * * * *